United States Patent [19]

Iwaki et al.

[11] Patent Number: 5,150,269
[45] Date of Patent: Sep. 22, 1992

[54] DISK CARTRIDGE WITH WRITE PROTECT MECHANISM

[75] Inventors: Yuji Iwaki; Masanori Funayama, both of Miyagi, Japan

[73] Assignee: Sony Corporation, Tokyo, Japan

[21] Appl. No.: 609,592

[22] Filed: Nov. 6, 1990

[30] Foreign Application Priority Data

Nov. 14, 1989 [JP] Japan ................................ 1-295589

[51] Int. Cl.$^5$ ............................................ G11B 23/03
[52] U.S. Cl. ...................................... 360/133; 360/60
[58] Field of Search ................................. 360/133, 60

[56] References Cited

U.S. PATENT DOCUMENTS

| 4,507,692 | 3/1985 | Sasaki | 360/60 |
| 4,685,017 | 8/1987 | Swinburne | 360/60 X |

Primary Examiner—A. J. Heinz
Attorney, Agent, or Firm—Philip M. Shaw, Jr.

[57] ABSTRACT

A disk cartridge with a write protect mechanism includes a cassette casing in which a disk is rotatably housed. The cassette casing includes upper and lower halves. The upper half includes a planar wall and a standing peripheral wall, and the lower half also includes a corresponding planar wall and a corresponding standing peripheral wall. The cassette casing is formed by facing the standing peripheral walls and firmly securing them to each other. A housing space is provided in the cassette casing for slidably receiving a manually operable switching member of the write protect mechanism therein. An inlet is provided at the standing peripheral walls of the upper and lower halves for communicating the housing space with an outside of the cassette casing therethrough. The manually operable switching member is inserted into the housing space through the inlet provided at the standing peripheral walls.

10 Claims, 5 Drawing Sheets

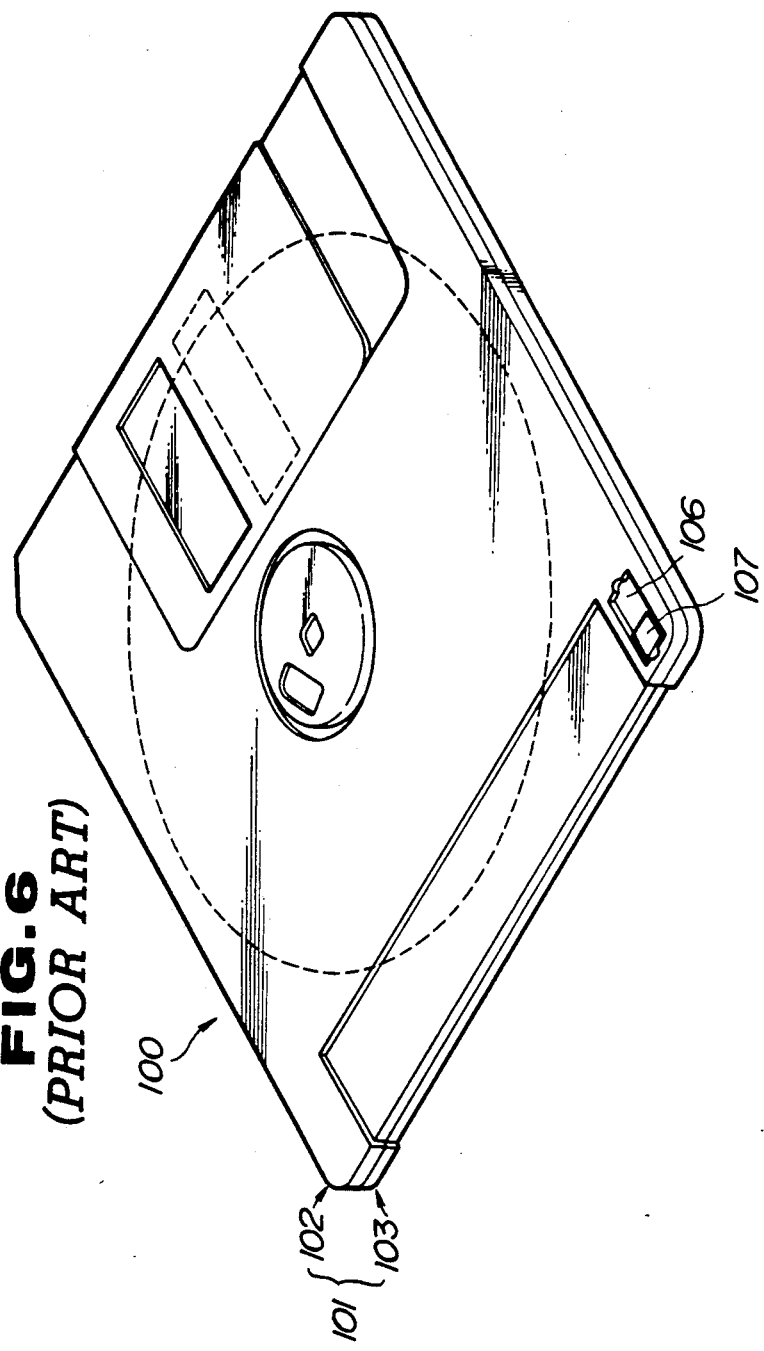
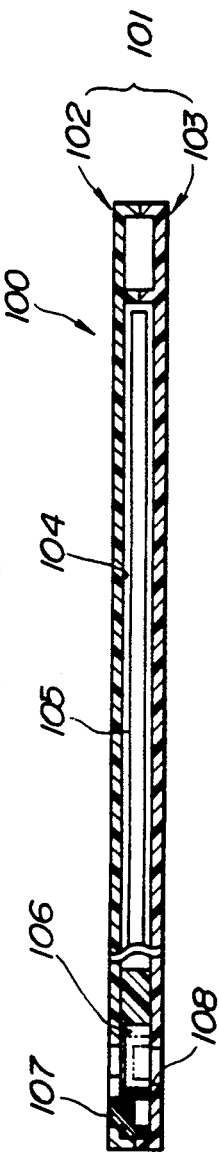
FIG. 6 (PRIOR ART)
FIG. 7 (PRIOR ART)

DISK CARTRIDGE WITH WRITE PROTECT MECHANISM

BACKGROUND OF THE INVENTION

1. Field of the Invention

The present invention relates generally to a disk cartridge with a write protect mechanism which prevents data stored on a disk from being erroneously erased from the disk and prevents new data from being erroneously written on the disk. More specifically, the invention relates to a disk cartridge with such a write protect mechanism, which allows a manually operable switching member of the write protect mechanism to be mounted into a cassette casing smoothly and easily from the outside after the cassette casing has been assembled.

2. Description of the Background Art

A disk cartridge with a write protect mechanism is known as shown, for example, in FIGS. 6 and 7. In FIGS. 6 and 7, a disk cartridge 100 includes a cassette casing 101 which is assembled by welding peripheral edges of an upper half 102 and a lower half 103. Though the upper half 102 is actually a lower half and the lower half 103 is actually an upper half due to FIG. 6 being a perspective view from a bottom side of the disk cartridge 100, directions of "upper, lower, right and left" will be used all through the specification according to the accompanying drawings. The cassette casing 101 includes a disk housing space 104 defined by the inner walls thereof, i.e. between the upper and lower halves 102 and 103, for rotatably housing a magnetic disk 105 therein.

A housing space 106 is further provided in the cassette casing 101 at its rear-right corner outward of the disk housing space 104 for receiving a manually operable switching member 107 of the write protect mechanism. The switching member 107 is slidable between a forward position as indicated in dotted lines in FIG. 7 where the switching member 107 blocks an opening 108 formed in the lower half 103 to prevent a detecting rod of a disk drive unit (not shown) from entering into the housing space 106 via the opening 108 so that the write protect is performed, and a backward position as indicated in solid lines in FIGS. 6 and 7 where the switching member 107 releases the opening 108 to allow the detecting rod to enter into the housing space 106 via the opening 108 so that the write protect is released.

In the background art of FIGS. 6 and 7, however, the upper and lower halves 102 and 103 are assembled together to form the cassette casing 101 with the manually operable switching member 107 being merely placed on a portion of the lower half 103 defining the housing space 106. Accordingly, it is likely to happen that the switching member 107 falls off the lower half 103 during the assembling of the upper and lower halves 102 and 103.

In order to eliminate the above-noted problem, another type of a disk cartridge has been proposed as disclosed in Japanese First Utility Model Publication (Jikkaisho) 62-110773, which allows the manually operable switching member to be mounted into the cassette casing from the outside after the upper and lower halves have been assembled together. FIGS. 8 and 9 show this type of the disk cartridge, wherein the same or like parts or members are designated by the same reference numerals as in FIGS. 6 and 7. FIG. 8 shows the state where the manually operable switching member 107 is mounted in the housing space 106, while, FIG. 9 shows the state where the switching member 107 is being inserted into the housing space 106. The upper half 102 of the cassette casing 101 is formed with a stepped opening 109 having a wider section 110. The wider section 110 works as an inlet for inserting the switching member 107. The switching member 107 has a pair of resilient leg portions 107a, 107a.

As shown in FIG. 9, when mounting the switching member 107 into the housing space 106, the switching member 107 is first inserted through the wider section 110 in an inclined posture with the leg portions 107a, 107a being also in an inclined posture. Accordingly, the mounting operations of the switching member 107 into the housing space 106 inevitably becomes bothersome and difficult, and further, deformation or breakage of the leg portions 107a of the switching member is likely to happen.

SUMMARY OF THE INVENTION

Accordingly, it is an object of the present invention to provide a disk cartridge with a write protect mechanism that can eliminate the above-noted defects inherent in the background art.

It is another object of the present invention to provide a disk cartridge with a write protect mechanism that can allow an manually operable switching member of the write protect mechanism to be mounted into a cassette casing smoothly and easily from the outside after the cassette case has been assembled.

To accomplish the above-mentioned and other objects, according to one aspect of the present invention, a disk cartridge with a write protect mechanism comprises:

a disk;

a cassette casing rotatably housing the disk therein, the cassette casing including a first half and a second half;

the first half of the cassette casing having a first essentially planar wall and a first standing peripheral wall extending from the first planar wall substantially in perpendicular thereto to surround at least a major portion of the first planar wall;

the second half of the cassette casing having a second essentially planar wall and a second standing peripheral wall extending from the second planar wall substantially in perpendicular thereto to surround at least a major portion of the second planar wall, the first and second standing peripheral walls being fixed together at their ends remote from the respective first and second planar walls to form the cassette casing;

a housing space provided in the cassette casing for movably receiving a manually operable switching member of the write protect mechanism therein;

inlet means, provided at the first and second standing peripheral walls at a position corresponding to the housing space, for guiding the manually operable switching member into the housing space from outside of the cassette casing.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings:

FIG. 6 is a perspective view from the bottom showing a disk cartridge of the background art;

FIG. 7 is a sectional view showing the disk cartridge of the background art of FIG. 6;

DESCRIPTION OF THE PREFERRED EMBODIMENT

Figure 1:
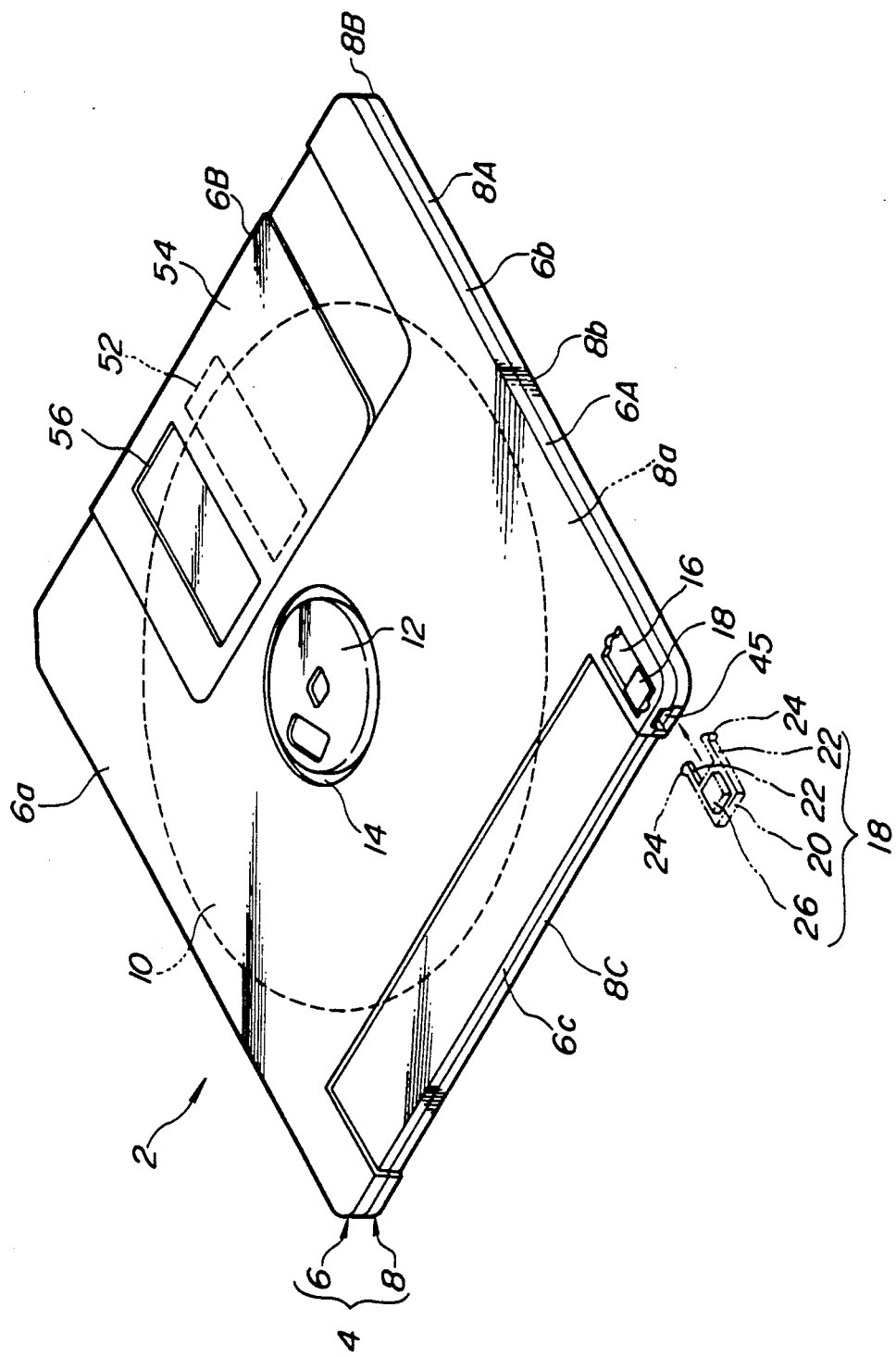
FIG. 1 is a perspective view from the bottom showing a disk cartridge according to a preferred embodiment of the present invention.

Referring now to the drawings, a preferred embodiment of a disk cartridge according to the present invention will be described with reference to FIGS. 1 to 5.

In FIG. 1, a disk cartridge 2 includes a cassette casing 4 which further includes an upper half 6 and a lower half 8. The upper half 6 has an essentially planar wall 6a of a substantially rectangular shape and a standing peripheral wall 6b which extends from peripheral edge of the planar wall 6a substantially in perpendicular to the planar wall 6a to surround at least a major portion of the latter. The standing peripheral wall 6b includes side walls 6A, 6A, a front wall 6B and a rear wall 6C. Similarly, the lower half 8 has an essentially planar wall 8a of a substantially rectangular shape and a standing peripheral wall 8b which extends from peripheral edge of the planar wall 8a substantially in perpendicular to the planar wall 8a to surround at least a major portion of the latter. The standing peripheral wall 8b includes side walls 8A, 8A, a front wall 8B and a rear wall 8C. The cassette casing 4 is formed by facing the standing peripheral walls 6b and 8b to each other so as to provide a housing space between the planar walls 6a and 8a for receiving a magnetic disk 10 therein, and then, by welding predetermined portions of the standing walls 6b and 8b.

The magnetic disk 10 is rotatably supported in the housing space formed between the planar walls 6a and 8a. A center hub 12 is secured to the magnetic disk 10 at the center portion thereof. The center hub 12 is exposed to the outside through a hub opening 14 which is formed in the upper half 6 at its center portion. When the disk cartridge 2 is loaded on a disk drive unit (not shown), the center hub 12 is designed to be chucked on a chucking section of the disk drive unit to be rotated.

Figure 3:
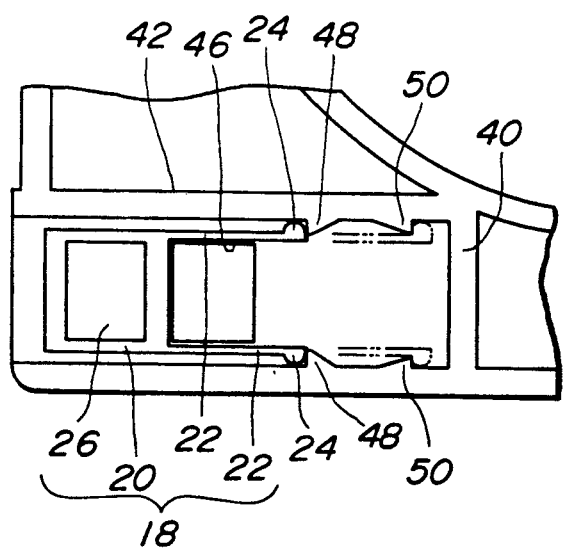
FIG. 3 is a plan view showing the lower half of the cassette casing of FIG. 1, with a manually operable switching, member of a write protect mechanism being incorporated.

A switching member housing space 16 is further provided in the cassette casing 4 at its rear-right corner between the planar walls 6a and 8a for slidably receiving a manually operable switching member, i.e. a write protect tab 18 therein. The manually operable switching member 18 is made of plastic and, as shown in FIGS. 1 and 3, includes an essentially rectangular body portion 20 having a pair of resilient leg portions 22, 22 extending in parallel to each other. Each leg portion 22 is formed at its free end with an outward projection of a semicircular shape in section. Further, a manually operable knob portion 26 of an essentially rectangular shape is provided on top of the body portion 20. The knob portion 26 is smaller in width and length than the body portion 20. The body portion 20, the leg portions 22, 22 and the knob portion 26 are formed integral with one another.

Figure 2:
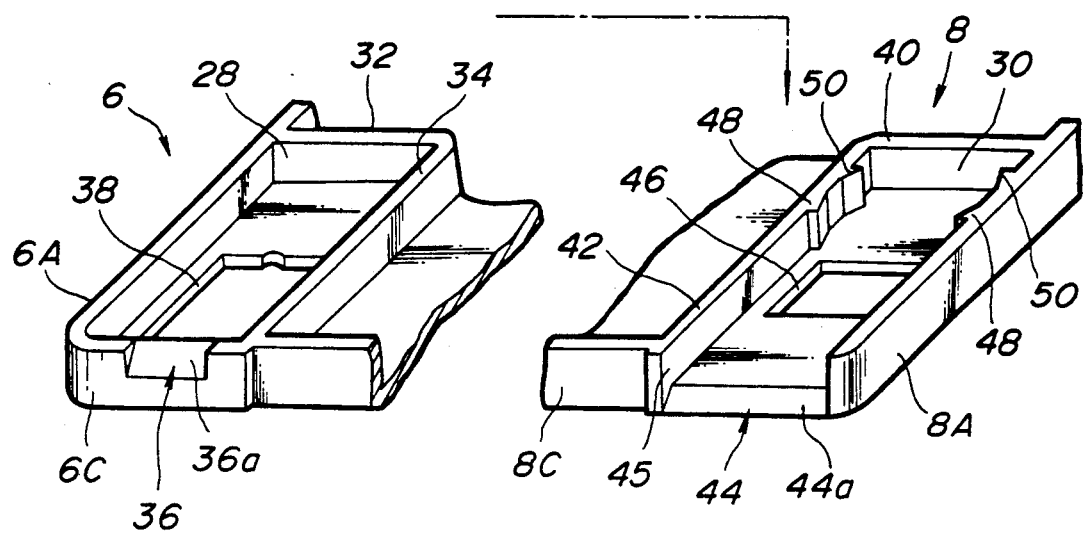
FIG. 2 is an exploded perspective view showing essential portions of upper and lower halves of a cassette casing shown in FIG. 1.

As shown in FIG. 2, the upper half 6 is provided with a recess 28 on its inner side and the lower half 8 is also provided with a corresponding recess 30 on its inner side. The switching member housing space 16 is formed by facing the recesses 28 and 30 to each other.

The recess 28 is essentially of a rectangular shape and defined by a portion of the rear wall 6C, a portion of one of the side walls 6A, a standing wall 32 projected from an inner surface of the planar wall 6a in parallel to the rear wall 6C and a standing wall 34 projected from the inner surface of the planar wall 6a in parallel to the side wall 6A. A cut-out or recess 36 having a slant surface 36a is formed on the rear wall 6c. The slant surface 36a is inclined so as to provide a larger space toward the outside for easy access of the knob portion 26 into the housing space 16, which will be described later. Further, an elongate guide opening 38 is formed in the planar wall 6a at a position corresponding to the housing space 16 for exposing the housing space 16 to the outside. With the manually operable switching member 18 being mounted in the housing space 16, the knob portion 26 slightly projects through the elongate guide opening 38 to the outside so that an operator can operate the switching member by handling the knob portion 26.

The recess 30 is essentially of a rectangular shape corresponding to the shape of the recess 28 and defined by a portion of the rear wall 8C, a portion of the side wall 8A, a standing wall 40 projected from an inner surface of the planar wall 8a in parallel to the rear wall 8C and a standing wall 42 projected from the inner surface of the planar wall 8a in parallel to the side wall 8A. A cut-out or recess 44 having a slant surface 44a is formed on the rear wall 8C across a width of the recess 30. The slant surface 44a is inclined so as to provide a larger space toward the outside for easy access of the leg portions 22, 22 and the body portion 20 into the housing space 16.

Figure 5:
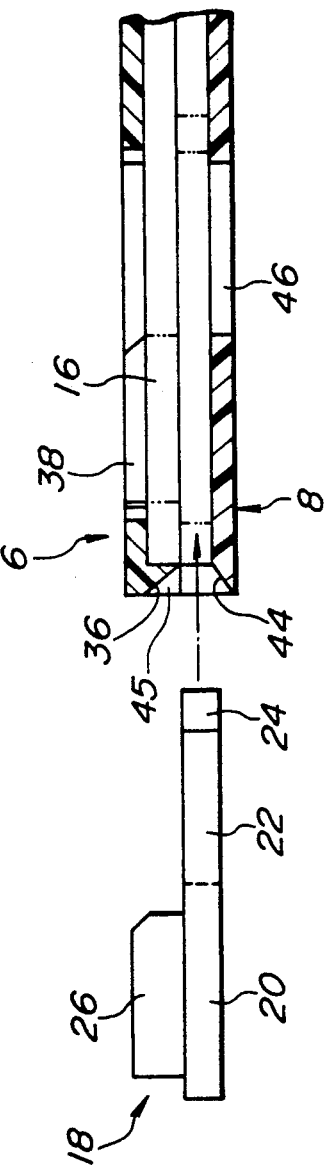
FIG. 5 is a partial sectional view showing essential portions of the disk cartridge of FIG. 1, for illustrating the manner of inserting the manually operable switching member into the cassette casing from the outside.
Figure 8:
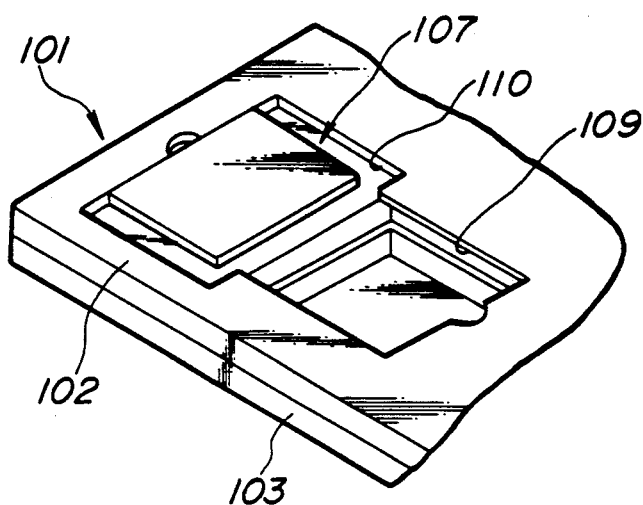
FIG. 8 is a partial perspective view from the bottom showing another type of a disk cartridge of the background art.
Figure 9:
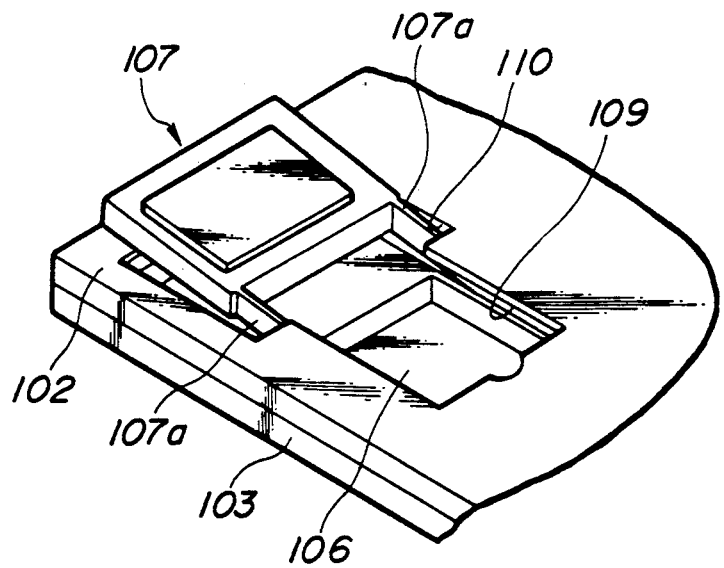
FIG. 9 is a partial perspective view from the bottom showing the disk cartridge of FIG. 8 for illustrating the manner of inserting an manually operable switching member of a write protect mechanism into the cassette casing from the outside according to the background art.

As seen from FIGS. 2 and 5, an inner end of the slant surface 36a of the cut-out 36 is positioned at the same level as remaining contacting surface of the standing peripheral wall 6b which contacts with corresponding contacting surface of the standing peripheral wall 8b, while, an inner end of the slant surface 44a of the cut-out 44 is positioned at the same level as the inner surface of the planar wall 8a so that a passage is provided between the cut-outs 36 and 44 for communicating or exposing the housing space 16 to the outside. Accordingly, the cut-outs 36 and 44 cooperatively work as an inlet 45 for inserting the manually operable switching member 18 into the housing space 16.

It is to be appreciated that the inner end of the slant surface 36a of the cut-out 36 may be positioned upper in FIG. 5 and that the inner end of the slant surface 44a of the cut-out 44 may also be positioned upper in FIG. 5.

A detection opening 46 is formed in the planar wall 8a to expose the housing space 16 to the outside. The detecting opening 46 is blocked or released depending on a position of the manually operable switching member 18 within the housing space 16 for controlling execution of the write protect. Specifically, the switching member 18 is slidable within the housing space 16 by operating the knob portion 26, between a forward position as indicated in dotted lines in FIG. 3 and a backward position as indicated in solid lines in FIG. 3. In the forward position, the body portion 20 of the switching member 18 blocks the detection opening 46 to prevent a detecting rod of a disk drive unit (not shown) from entering into the housing space 16 via the detection opening 46 so that the write protect is performed. On the other hand, in the backward position, the body portion 20 of the switching member 18 releases the detection opening 46 to allow the detecting rod to enter into the housing space 16 via the detection opening 46 so that the write protect is released.

As shown in FIGS. 2 and 3, a pair of projections 48, 48 are formed on the side wall 8A and the standing wall 42 in the recess 30 near the standing wall 40, and another pair of projections 50, 50 are formed on the side wall 8A and the standing wall 42 in the recess 30 more neighboring the standing wall 40. The projections 48, 48 work to engage with the outward projections 24, 24 of the switching member leg portions 22, 22 so as to lock the switching member 18 in the above-noted backward position. On the other hand, the projections 50, 50 work to engage with the outward projections 24, 24 so as to lock the switching member 18 in the above-noted forward position.

As shown in FIG. 1, the disk cartridge 2 is further provided with a disk exposing mechanism which exposes a part of the magnetic disk 10 to the outside. The disk exposing mechanism includes a pair of rectangular shaped openings 52, 52, a sliding shutter 54 and a torsion coil spring (not shown). The openings 52, 52 are formed in the upper and lower planar walls 6a and 8a of the cassette casing 4 at the front portion thereof so that a part of the magnetic disk 10 is exposable to the outside. The sliding shutter 54 is slidably supported on the cassette casing 4, and is formed with shutter openings 56, 56 having substantially the same shape as that of the openings 52, so that the sliding shutter 54 can open and close the openings 52. One end of the torsion coil spring engages the slinding shutter 54 and the other end is supported on the cassette casing 4, so that the sliding shutter 54 is biased by means of the spring to close the opening 52. When the disk cartridge 2 is loaded on the disk drive unit, the sliding shutter 54 is slided against the biasing force of the spring. Accordingly, the position of the shutter openings 56 coincides with that of the openings 52 so as to set the sliding shutter 54 at the open position in which a part of the magnetic disk 10 is exposed to the outside.

Figure 4:
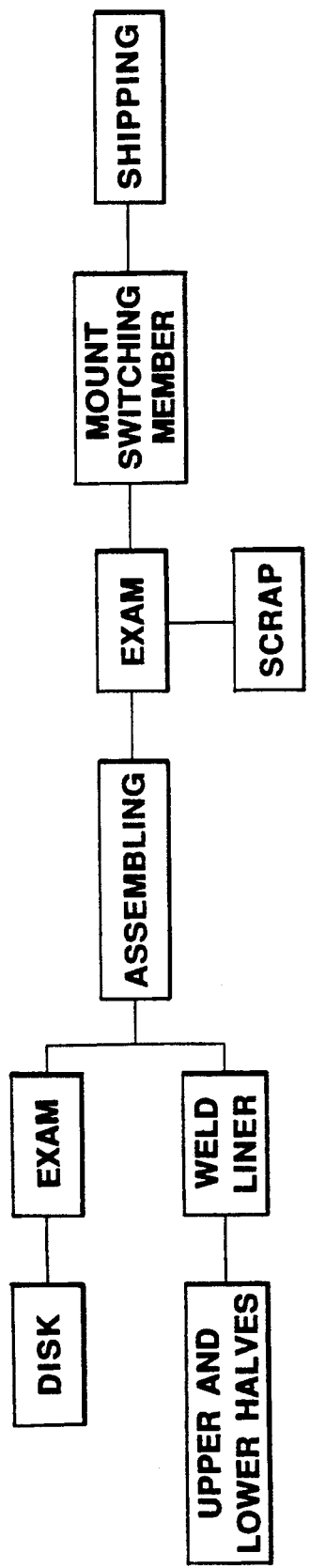
FIG. 4 is a flowchart showing assembling process of the disk cartridge of FIG. 1.

Now, the assembling process of the disk cartridge 2 will be described with reference to FIG. 4.

First, the magnetic disk 10 is examined, and in parallel, liners are welded to the mutual contacting surfaces of the standing walls 6b and 8b. Subsequently, the magnetic disk 10 with the center hub 12, the sliding shutter 54, the torsion coil spring, a lifter and the like are set in the known manner. Afterward, the predetermined portions of the standing walls 6b and 8b of the upper and lower halves 6 and 8 are welded together for a further examination. In cases the assembled product is non-accepted, then, it is thrown away or scrapped. On the other hand, when the assembled product is accepted, then, the manually operable switching member 18 is mounted into the housing space 16 through the inlet 45 to provide a final product for shipping. Since the switching member 18 is incorporated only into the accepted product, waste of the switching member 18 is effectively avoided.

As shown in FIG. 5, the switching member 18 is inserted into the inlet 45 of the housing space 16 with the free ends of the resilient leg portions 22 being directed to the inlet 45 and with the knob portion 26 being directed upward. When the switching member 18 is pushed toward the inlet 45, the leg portions are smoothly guided into the inlet 45 by means of the slant surfaces of the cut-outs 36 and 44. By further pushing the switching member 18, a forward end of the knob portion 26 contacts with the slant surface 36a of the cut-out 36 to displace the slant surfaces 36a and 44a including their neighboring portions in opposite directions from each other so as to force open the inlet 45 wider so that the switching member 18 is mounted in the housing space 16 with the knob portion 26 being engaged into the elongate guide opening 38 for sliding movement therewithin.

After the switching member 18 is mounted in the housing 16, the slant surfaces of the cut-outs 36 and 44 including their neighboring portions which were displaced in the opposite directions returns to the initial position to make dimensions of the inlet 45 return initial. Accordingly, falling off of the switching member 18 from the housing space is effectively prevented.

It is to be appreciated that, in order to force open wider the inlet 45, it is preferable not to weld those portions of the standing walls 6b and 8b neighboring the inlet 45.

As appreciated from the foregoing description, since the inlet of the switching member housing space is provided at the peripheral standing walls of the upper and lower halves of the cassette casing, the inclined posture of the switching member which is otherwise required as in the background art when inserting the switching member into the housing space, is effectively avoided. Accordingly, the mounting operations of the switching member into the housing space becomes simple and easy, and the unnecessary deformation or breakage of the leg portions of the switching member is effectively avoided.

It is to be understood that this invention is not to be limited to the embodiment described above, and that various changes and modifications may be made without departing from the spirit and scope of the invention as defined in the appended claims.

What is claimed is:

1. A disk cartridge with a write protect mechanism comprising:

a cassette casing for rotatably housing a recording medium disk therein, the cassette casing including a first half and a second half, each of which have upstanding peripheral side walls and wherein the sidewalls of the first half abut against the side walls of the second half;

a manually operable write protect tab;

a housing space provided in the cassette casing for movably receiving the manually operable write protect tab therein to allow the write protect tab to slide between different indicating positions wherein a first side wall of the first half and an abutting, second side wall of the second half each have a first recess and a second recess, respectively, therein which together form an opening from the housing space to the outside of the cassette casing;

wherein the first and second sidewalls at least in the vicinity of the opening are elastically deformable and the opening is dimensioned to allow insertion of the write protect tab into the housing space subject to elastic expansion of the opening as the write protect tab is inserted into the opening so as to capture the inserted write protect tab within the housing space one the write protect tab is fully inserted into the housing space.

2. The disk cartridge as set forth in claim 1, wherein the first recess includes a first slant surface which extends along the first side wall and inclines to make the dimensions of the opening larger in cross section toward the outside of the cassette casing, and the second recess includes a second slant surface which extends along the second side wall and inclines to make dimensions of the opening larger in cross section toward the outside of the cassette casing.

3. The disk cartridge as set forth in claim 2, wherein the first slant surface extends along the first side wall over a portion of a width of the housing space, and the second slant surface extends along the second side wall over the width of the housing space.

4. The disk cartridge as set forth in claim 2, wherein the first half has a first planar wall which is perpendicular to and connects with the side walls of the first half, the second half has a second planar wall which is perpendicular to and connects with the side walls of the second half, an inner end of the first slant surface adjacent to the housing space is located at substantially the same level with a remaining contacting surface of the first side wall which contacts with a corresponding contacting surface of the second side wall, and an inner end of the second slant surface adjacent to the housing space and facing the inner end of the first slant surface is located at the same level with an inner surface of the second planar wall.

5. The disk cartridge as set forth in claim 4, wherein a distance between the inner ends of the first and second slant surfaces is less than a height of the manually operable write protect tab, whereby the manually operable write protect tab is inserted into the housing space through the opening by displacing the first and second slant surfaces in opposite directions to open wider the distance between the inner ends of the first and second slant surfaces.

6. The disk cartridge as set forth in claim 4, wherein the manually operable write protect tab includes a body portion having planar surfaces facing each other and a side surface connecting the planar surfaces, and a pair of leg portions extending from the side surface substantially in parallel to each other, the manually operable write protect tab further including a manually operable knob portion disposed on one of the planar surfaces, and wherein a distance between the inner ends of the first and second slant surfaces is less than a distance between the other of the planar surface and an end surface of the knob portion remote from the body portion.

7. The disk cartridge as set forth in claim 6, wherein an elongate opening is formed in the first planar wall to expose the housing space to the outside of the cassette casing through the elongate opening, and wherein the knob portion of the manually operable write protect tab slightly projects from the elongate opening to be manually operated to move within the elongate opening so that the body portion and the leg portions of the manually operable write protect tab move within the housing space.

8. The disk cartridge as set forth in claim 7, wherein the first slant surface of the first recess is provided for easy access of the knob portion into the housing space, and the second slant surface of the second recess is provided for easy access of the leg portions and the body portions into the housing space.

9. The disk cartridge as set forth in claim 8, wherein the body portion and the knob portion of the manually operable write protect tab are essentially of rectangular shape, the knob portion having width and length each less than those of the body portion, and wherein the first slant surface extends along the first side wall over a portion of a width of the housing space corresponding to the width of the knob portion, and the second slant surface extends along the second side wall over the width of the housing space corresponding to the width of the body.

10. The disk cartridge as set forth in claim 1, wherein the first and second planar walls are essentially of rectangular shape.

* * * * *